United States Patent
Zhang et al.

(10) Patent No.: US 11,081,888 B2
(45) Date of Patent: Aug. 3, 2021

(54) METHOD, APPARATUS, AND MEDIUM FOR CALCULATING CAPACITIES OF PHOTOVOLTAIC POWER STATIONS

(71) Applicants: TSINGHUA UNIVERSITY, Beijing (CN); ECONOMIC AND TECHNOLOGICAL RESEARCH INSTITUTE, STATE GRID SHANDONG ELECTRIC POWER COMPANY, Jinan (CN)

(72) Inventors: Jian Zhang, Beijing (CN); Xin Tian, Jinan (CN); Xueliang Li, Jinan (CN); Ning Zhang, Beijing (CN); Jian Wu, Jinan (CN); Long Zhao, Jinan (CN); Yan Wang, Jinan (CN); Zhijie Zheng, Jinan (CN); Hong Mou, Jinan (CN); Yuan Wang, Jinan (CN); Xiaoming Liu, Jinan (CN); Jie Zhang, Jinan (CN); Xiaonan Gao, Jinan (CN); Jianing Zhang, Jinan (CN); Dong Liu, Jinan (CN); Ying Mou, Jinan (CN); Shanjie Jia, Jinan (CN); Bo Li, Jinan (CN); Yi Zhu, Jinan (CN); Xiaohai Gao, Jinan (CN); Xin Wei, Jinan (CN); Jia Wei, Jinan (CN)

(73) Assignees: TSINGHUA UNIVERSITY, Beijing (CN); ECONOMIC AND TECHNOLOGICAL RESEARCH INSTITUTE, STATE GRID SHANDONG ELECTRIC POWER COMPANY, Jinan (CN)

( * ) Notice: Subject to any disclaimer, the term of this patent is extended or adjusted under 35 U.S.C. 154(b) by 58 days.

(21) Appl. No.: 16/539,434

(22) Filed: Aug. 13, 2019

(65) Prior Publication Data
US 2020/0059101 A1   Feb. 20, 2020

(30) Foreign Application Priority Data

Aug. 14, 2018  (CN) .......................... 201810919782.7

(51) Int. Cl.
*H02J 3/00* (2006.01)
*H02J 3/38* (2006.01)

(52) U.S. Cl.
CPC .............. *H02J 3/383* (2013.01); *H02J 3/004* (2020.01); *H02J 2203/20* (2020.01)

(58) Field of Classification Search
CPC .......... Y02E 10/50; Y02E 10/56; H02J 3/383; H02J 3/004; H02J 2300/24; H02J 2203/20;
(Continued)

(56) References Cited

U.S. PATENT DOCUMENTS

| 2002/0026982 A1* | 3/2002 | Bredt ...................... B28B 1/001 156/284 |
| 2005/0039787 A1* | 2/2005 | Bing ....................... H02J 3/004 136/243 |

(Continued)

*Primary Examiner* — Darrin D Dunn
(74) *Attorney, Agent, or Firm* — Hodgson Russ LLP

(57) ABSTRACT

The present disclosure provides a method, an apparatus, and a medium for calculating capacities of a plurality of photovoltaic power stations. The method includes: receiving a plurality of historical weather data sets from the plurality of weather monitoring stations; determining a scene year based on the plurality of historical weather data sets; receiving an actual generating capacity of each photovoltaic power station predicted by a power system dispatch center; extracting weather data of each photovoltaic power station in the scene year from the corresponding historical weather data set; obtaining an available generating capacity of each photovoltaic power station in the scene year based on the weather data; and determining a capacity of each photovoltaic power (Continued)

US 11,081,888 B2

Page 2 station in the scene year according to the actual generating capacity and the available generating capacity of each photovoltaic power station.

18 Claims, 3 Drawing Sheets

(58) Field of Classification Search
CPC ........ H02J 3/381; H02J 3/466; H02J 2203/10; G06Q 10/04; G06Q 50/06; G06F 17/18; Y02B 10/10; G05B 13/048
See application file for complete search history.

(56) References Cited

U.S. PATENT DOCUMENTS

| | | | |
|---|---|---|---|
| 2010/0017341 A1* | 1/2010 | Bing | G01W 1/10 705/36 R |
| 2010/0198420 A1* | 8/2010 | Rettger | H02S 10/00 700/291 |
| 2012/0065788 A1* | 3/2012 | Harper, III | G06F 1/329 700/291 |
| 2013/0066569 A1* | 3/2013 | Sato | H01L 31/02021 702/60 |
| 2013/0074513 A1* | 3/2013 | Mueller | F01K 13/02 60/773 |
| 2015/0094969 A1* | 4/2015 | Jungerman | H02S 50/10 702/61 |
| 2015/0186904 A1* | 7/2015 | Guha | G06Q 50/06 705/7.26 |
| 2017/0140077 A1* | 5/2017 | Lin | H02S 50/00 |
| 2017/0227583 A1* | 8/2017 | Hoff | G01R 21/1331 |
| 2018/0248380 A1* | 8/2018 | Khabibrakhmanov | H02J 3/38 |
| 2019/0155234 A1* | 5/2019 | Devi | H02J 3/004 |

* cited by examiner

METHOD, APPARATUS, AND MEDIUM FOR CALCULATING CAPACITIES OF PHOTOVOLTAIC POWER STATIONS

CROSS-REFERENCE TO RELATED APPLICATIONS

This application is based upon and claims priority to Chinese Patent Application 201810919782.7, filed on Aug. 14, 2019, the entire contents of which is incorporated herein by reference.

FIELD

The present disclosure relates to a field of new energy resources, and more particularly to a method, an apparatus, and a medium for calculating capacities of a plurality of photovoltaic power stations.

BACKGROUND

With depletion of fossil fuels and environmental pollution becoming serious, power generating technologies represented by photovoltaic power generating has become important. However, the photovoltaic power generating has features of randomness, volatility, and uncertainty. Such features make serious challenges to an operation of a power system.

SUMMARY

According to embodiments of the present disclosure, a method for calculating capacities of a plurality of photovoltaic power stations is provided. The plurality of photovoltaic power stations correspond to a plurality of weather monitoring stations. Each photovoltaic power station in the plurality of photovoltaic power stations has a one-to-one correspondence with each weather monitoring station in the plurality of weather monitoring stations. The method includes: receiving a plurality of historical weather data sets from the plurality of weather monitoring stations, each historical weather data set in the plurality of historical weather data sets having a one-to-one correspondence with each photovoltaic power station in the plurality of photovoltaic power stations; determining a scene year based on the plurality of historical weather data sets; receiving an actual generating capacity of each photovoltaic power station in the plurality of photovoltaic power stations predicted by a power system dispatch center; extracting weather data of each photovoltaic power station in the plurality of photovoltaic power stations in the scene year from the corresponding historical weather data set; obtaining an available generating capacity of each photovoltaic power station in the plurality of photovoltaic power stations in the scene year based on the weather data; and determining a capacity of each photovoltaic power station in the scene year according to the actual generating capacity and the available generating capacity of each photovoltaic power station.

According to embodiments of the present disclosure, an apparatus for calculating capacities of a plurality of photovoltaic power stations is provided. The plurality of photovoltaic power stations correspond to a plurality of weather monitoring stations. Each photovoltaic power station in the plurality of photovoltaic power stations has a one-to-one correspondence with each weather monitoring station in the plurality of weather monitoring stations. The apparatus includes: a processor, and a memory. The memory is configured to store computer instructions. The processor is configured to execute the computer instructions, to carry out: receiving a plurality of historical weather data sets from the plurality of weather monitoring stations, each historical weather data set in the plurality of historical weather data sets having a one-to-one correspondence with each photovoltaic power station in the plurality of photovoltaic power stations; determining a scene year based on the plurality of historical weather data sets; receiving an actual generating capacity of each photovoltaic power station in the plurality of photovoltaic power stations predicted by a power system dispatch center; extracting weather data of each photovoltaic power station in the plurality of photovoltaic power stations in the scene year from the corresponding historical weather data set; obtaining an available generating capacity of each photovoltaic power station in the plurality of photovoltaic power stations in the scene year based on the weather data; and determining a capacity of each photovoltaic power station in the scene year according to the actual generating capacity and the available generating capacity of each photovoltaic power station.

According to embodiments of the present disclosure, a non-transient computer-readable storage medium is provided. The non-transient computer-readable storage medium has computer instructions stored thereon. When the computer instructions are executed by a processor, the computer instructions are configured to execute: receiving a plurality of historical weather data sets from the plurality of weather monitoring stations, each historical weather data set in the plurality of historical weather data sets having a one-to-one correspondence with each photovoltaic power station in the plurality of photovoltaic power stations; determining a scene year based on the plurality of historical weather data sets; receiving an actual generating capacity of each photovoltaic power station in the plurality of photovoltaic power stations predicted by a power system dispatch center; extracting weather data of each photovoltaic power station in the plurality of photovoltaic power stations in the scene year from the corresponding historical weather data set; obtaining an available generating capacity of each photovoltaic power station in the plurality of photovoltaic power stations in the scene year based on the weather data; and determining a capacity of each photovoltaic power station in the scene year according to the actual generating capacity and the available generating capacity of each photovoltaic power station.

DETAILED DESCRIPTION

Figure 1:
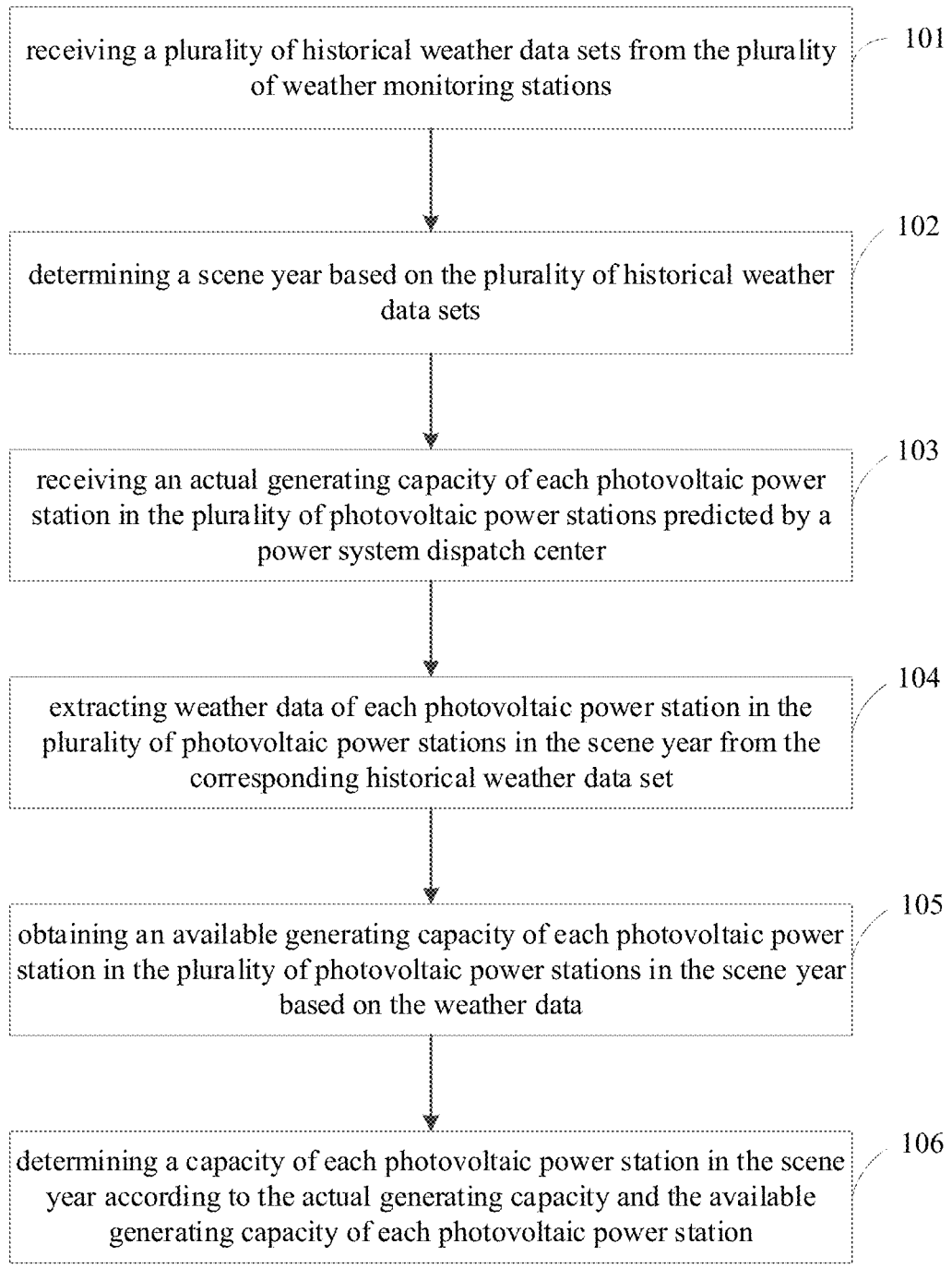
FIG. 1 is a flow chart illustrating a method for calculating capacities of a plurality of photovoltaic power stations according to embodiments of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure.

The same or similar elements and the elements having same or similar functions are denoted by like reference numerals throughout the descriptions.

FIG. 1 illustrates a flow chart of a method for calculating capacities of a plurality of photovoltaic power stations according to embodiments of the present disclosure. The plurality of photovoltaic power stations correspond to a plurality of weather monitoring stations. Each photovoltaic power station in the plurality of photovoltaic power stations has a one-to-one correspondence with each weather monitoring station in the plurality of weather monitoring stations. As illustrated in FIG. 1, the method includes acts in the following blocks.

At block 101, a plurality of historical weather data sets is received from the plurality of weather monitoring stations. Each historical weather data set in the plurality of historical weather data sets has a one-to-one correspondence with each photovoltaic power station in the plurality of photovoltaic power stations.

At block 102, a scene year is determined based on the plurality of historical weather data sets.

At block 103, an actual generating capacity of each photovoltaic power station in the plurality of photovoltaic power stations is received from a power system dispatch center. The actual generating capacity of each photovoltaic power station may be predicted by the power system dispatch center.

At block 104, weather data of each photovoltaic power station in the plurality of photovoltaic power stations in the scene year is extracted from the corresponding historical weather data set.

At block 105, an available generating capacity of each photovoltaic power station in the plurality of photovoltaic power stations in the scene year is obtained based on the weather data.

At block 106, a capacity of each photovoltaic power station in the scene year is determined according to the actual generating capacity and the available generating capacity of each photovoltaic power station.

The embodiments of the method will be described in detail in the following.

At step (1), a basic information set of each photovoltaic power station is established, and corresponding data or information for the basic information set of each photovoltaic power station is inputted. The basic information set of each photovoltaic power station may include at least one of: geographic information, an installation and operation way, an installation area, and component parameters corresponding to each photovoltaic power station.

At step (2), a historical weather information base of each photovoltaic power station is established, and historical irradiation characteristic indicators of each photovoltaic power station are calculated. The historical irradiation characteristic indicators of each photovoltaic power station may include at least one of: a total year irradiation, an average daily irradiation, a maximum value of daily irradiations, a minimum value of daily irradiations, and an imbalance daily irradiation corresponding to each photovoltaic power station.

At step (3), based on the historical irradiation characteristic indicators of each photovoltaic power station, which are calculated at the step (2), one or more typical scene years are selected, and a whole-scene-year weather base of each photovoltaic power station is generated for each scene year.

At step (4), a power sequence of each photovoltaic power station by time in each typical scene year is calculated according to the generated whole-scene-year weather base.

At step (5), a timing operation simulation of the power system is performed based on an optimizing target by taking a daily operation simulation with a minimum operation cost for a year, to obtain a year actual power sequence of each photovoltaic power station by time.

At step (6), based on the year actual power sequence of each photovoltaic power station, which is obtained by the timing operation simulation, the capacities of each photovoltaic power station in different typical scene years may be calculated.

Further, at the step (1), the basic information set of each photovoltaic power station is represented by a formula of:

$$PVSI_i = \{GI_i, IM_i, IA_i, CP_i\},$$

where:

$PVSI_i$ represents the basic information set of the $i^{-th}$ photovoltaic power station, $i=1, 2, \ldots, N$, and N is a positive integer;

$GI_i$ represents the geographic information of the $i^{-th}$ photovoltaic power station, and $GI_i=[\text{Latitude}_i, \text{Longitude}_i, \text{Altitude}_i,]$, in which, $\text{Latitude}_i$ represents latitude data, $\text{Longitude}_i$ represents longitude data, and $\text{Altitude}_i$ represents altitude data;

$IM_i$ represents the installation and operation way of the $i^{-th}$ photovoltaic power station, and $IM_i \in \{A,B,C,D,E,F\}$, in which, A represents a fixed way of optimizing inclination angle, B represents a flat single-axis tracking way, C represents an oblique single-axis tracking way, D represents a two-axis tracking way, E represents a fixed adjustable way, and F represents other installation way;

$IA_i$ represents the installation area of the $i^{-th}$ photovoltaic power station, and $$IA_i = \sum_{j=1}^{n} ia_j,$$

in which, $ia_j$ represents an area of the $j^{-th}$ photovoltaic panel of the $i^{-th}$ photovoltaic power station, and a unit of the area is m², i.e., square meter;

$CP_i$ represents the component parameters, and $CP_i=[RT_i, \eta_i^{ef}, \eta_i^{ce}]$, in which, $RT_i$ represents a rating operating temperature of photovoltaic components of the $i^{-th}$ photovoltaic power station, and the unit of the rated operating temperature is ° C.; $\eta_i^{ef}$ represents an equivalent irradiation coefficient of an inclined surface of the $i^{-th}$ photovoltaic power station, which is determined by the installation and operation way of the $i^{-th}$ photovoltaic power station; $\eta_i^{ce}$ represents the conversion efficiency of the $i^{-th}$ photovoltaic power station, which is determined by technical parameters of photovoltaic components. The conversion efficiency may include a conversion efficiency of components, an efficiency of an inverter, and a correction for line loss.

Further, establishing the historical weather information base of each photovoltaic power station and calculating the historical irradiation characteristic indicators of each photovoltaic power station, may include following steps.

At step (2-1), the weather monitoring station corresponding to each photovoltaic power station is determined based on geographic information of each photovoltaic power station.

The weather monitoring station closest to the photovoltaic power station is selected as the weather monitoring station corresponding to the photovoltaic power station according to the latitude, longitude, and altitude of each photovoltaic power station, and the latitude, longitude, and altitude of each weather monitoring station.

At step (2-2), historical weather information corresponding to each weather monitoring station is input as the historical weather information base corresponding to each photovoltaic power station. The historical weather information base is represented by a formula of:

$$WD_i = \{WI_{year} | year = year1, year2, \ldots, yearn\},$$

where:

$WD_i$ represents the historical weather information base of the $i^{-th}$ photovoltaic power station;

$WI_{year}$ represents a weather data set of the weather monitoring station corresponding to the $i^{-th}$ photovoltaic power station in a certain year; and year represents the year corresponding to the historical weather data.

At step (2-3), the irradiation characteristic indicators of the historical weather data of each photovoltaic power station are calculated by the following steps.

At step (2-3-1), the total year irradiation of each photovoltaic power station is calculated by a formula of:

$$SQT_i(year) = \sum_{d=1}^{D} SQR_i^{year}(d),$$

where:

$SQT_i(year)$ represents the total irradiation of the $i^{-th}$ photovoltaic power station in the year, and the unit of the total irradiation is MJ/m$^2$;

$SQR_i^{year}(d)$ represents the total irradiation of the $i^{-th}$ photovoltaic power station on the d$^{-th}$ day of the yea, the unit of which is MJ/(m$^2$□d); and D represents the total number of days in the year, the total number of days is 365 in a standard calendar, and the total number of days is 366 in a leap year.

At step (2-3-2), the average daily irradiation of each photovoltaic power station is calculated by a formula of:

$$\overline{SQR_i}(year) = \frac{SQT_i(year)}{D},$$

where:

$\overline{SQR_i}(year)$ represents the average daily irradiation of the $i^{-th}$ photovoltaic power station in the year.

At step (2-3-3), the maximum value of daily irradiations of each photovoltaic power station is calculated by a formula of:

$$R\,MAX_i(year) = \max(SQR_i^{year}(d)),$$

where:

$RMAX_i(year)$ represents the maximum value of daily irradiations of the $i^{-th}$ photovoltaic power station in the year; and max( ) represents a standard function for calculating the maximum value.

At step (2-3-4), the minimum value of daily irradiations of each photovoltaic power station is calculated by a formula of:

$$R\,MIN_i(year) = \min(SQR_i^{year}(d)),$$

where:

$RMIN_i(year)$ represents the minimum value of daily irradiations of the $i^{-th}$ photovoltaic power station in the year; and min( ) represents a standard function for calculating the minimum value.

At step (2-3-5), the imbalance daily irradiation of each photovoltaic power station is calculated by a formula of:

$$RD_i(year) = \max(SQR_i^{year}(d)) - \min(SQR_i^{year}(d)),$$

where:

$RD_i(year)$ represents the imbalance daily irradiation of the $i^{-th}$ photovoltaic power station in the year.

Further, at the step (3), based on the historical irradiation characteristic indicators of each photovoltaic power station, which are calculated at the step (2), selecting one or more typical scene years and generating a whole-scene-year weather base of each photovoltaic power station, include following steps.

At step (3-1), the typical scene year is selected based on the historical irradiation characteristic indicators of the photovoltaic power station includes following steps.

At step (3-1-1), a year corresponding to the maximum value of average daily irradiations and a year corresponding to the minimum value of average daily irradiations of all the photovoltaic power stations are selected.

At step (3-1-2), a year corresponding to the maximum value of daily irradiations and a year corresponding to the minimum value of daily irradiations of all the photovoltaic power stations are selected.

At step (3-1-3), a year corresponding to the maximum value of imbalance daily irradiations and a year corresponding to the minimum value of imbalance daily irradiations of all the photovoltaic power stations are selected.

At step (3-2), a sequence of weather information by hours of the photovoltaic power station is selected based on the above typical scene year as the whole-scene-year weather base with a typical radiation characteristic corresponding to each photovoltaic power station, which may include following steps.

At step (3-2-1), a sequence of irradiations is selected by hours.

The sequence $SR_i^{year}(t)$ of irradiations in the six years is selected, in which, t=1, 2, . . . , T, a value of T is 8760 in a standard calendar, a value of T is 8784 in a leap year, $SR_i^{year}(t)$ represents an irradiation of the $i^{-th}$ photovoltaic power station in the t$^{-th}$ period of time in the scene year.

At step (3-2-2), a sequence of temperature values is selected by hours.

The sequence $ET_i^{year}(t)$ of temperature values in the six years is selected, in which, t=1, 2, . . . , T, a value of T is 8760 in a standard calendar, a value of T is 8784 in a leap year, $ET_i^{year}(t)$ represents a temperature value of the $i^{-th}$ photovoltaic power station in the t$^{-th}$ period of time in the scene year.

Further, at the step (4), calculating the power sequence of each photovoltaic power station in each typical scene year according to the generated whole-scene-year weather base includes following steps.

At the step (4-1), a correction coefficient sequence of each photovoltaic power station for power is calculated by a formula of:

$$\eta_i^{year}(t) = 1 + \varphi\left(ET_i^{year}(t) - 25°\,C. + \frac{(RT_i - 20°\,C.)SR_i^{year}(t)}{800\,W/m^2}\right).$$

where:

$\eta_i^{year}(t)$ represents the correction coefficient sequence of the $i^{-th}$ photovoltaic power station in the War for power, and also represents a power correction coefficient of the $i^{-th}$ photovoltaic power station in the $t^{-th}$ period of time in the scene year;

φ represents a peak power temperature coefficient, which may be adjusted based on a property parameter of the photovoltaic component.

At the step (4-2), the whole year power sequence is calculated by a formula of:

$$PV_i^{year}(t) = SR_i^{year}(t) * IA_i * \eta(IM_i) * \eta_i^{year}(t) * \eta(CP_i).$$

where:

$PV_i^{year}(t)$ represents the power sequence of the $i^{-th}$ photovoltaic power station in the year year, and also represents a power of the $i^{-th}$ photovoltaic power station in the $t^{-th}$ period of time in the scene year year;

$\eta(IM_i)$ represents an equivalent irradiation coefficient of an inclined surface, which is determined by the installation and operation way of the $i^{-th}$ photovoltaic power station;

$\eta(CP_i)$ represents a conversion efficiency of the $i^{-th}$ photovoltaic power station, which is determined by technical parameters of photovoltaic components. The conversion efficiency may include a conversion efficiency of components, an efficiency of an inverter, and a correction for line loss.

Further, at step (6), calculating the capacities of each photovoltaic power station in different typical scene years based on a timing operation simulation result includes following steps.

At step (6-1), an actual generating capacity of each photovoltaic power station is calculated based on an actual power sequence of each photovoltaic power station in a year in the timing operation simulation result by a formula of:

$$PVQ_i^{year} = \sum_{t=1}^{T} PVR_i^{year}(t).$$

where:

$PVQ_i^{year}$ represents the actual generating capacity of the $i^{-th}$ photovoltaic power station in the year;

$PVR_i^{year}(t)$ represents the actual power sequence of the $i^{-th}$ photovoltaic power station in the year.

At step (6-2), an available generating capacity of the photovoltaic power station is calculated based on the power sequence of the photovoltaic power station by a formula of:

$$PVA_i^{year} = \sum_{t=1}^{T} PV_i^{year}(t).$$

where:

$PVA_i^{year}$ represents the available generating capacity of the $i^{-th}$ photovoltaic power station in the year.

At step (6-3), the capacity of the photovoltaic power station is calculated according to the actual generating capacity and the available generating capacity of the photovoltaic power station by a formula of:

$$\square_i^{year} = \frac{PVQ_i^{year}}{PVA_i^{year}} * 100\%.$$

where:

$\square_i^{year}$ represents the capacity of the $i^{-th}$ photovoltaic power station in the year.

Detailed illustration is further made below to a method, an apparatus, and a medium for calculating capacities of a plurality of photovoltaic power stations provided by the present disclosure, with reference to accompanying drawings and embodiments.

A method for calculating capacities of a plurality of photovoltaic power stations in embodiments of the present disclosure takes a certain local power grid, to evaluate three photovoltaic power stations which operate in a year. That is, N=3, and I=1, 2, N. The method includes following steps.

At step (1), the basic information sets $PVSI_1$, $PVSI_2$, $PVSI_3$ of respective photovoltaic power stations are established, and basic information of each photovoltaic power station is input to each corresponding basic information set. The basic information set of each photovoltaic power station includes geographic information $GL_i$, an installation and operation way $IM_i$, an installation area $IA_i$ and component parameters $CP_i$ corresponding to each photovoltaic power station.

At step (1-1), the geographic information of each photovoltaic power station is input, and $GI_i$=[Latitude$_i$,Longitude$_i$,Altitude$_i$]. Latitude$_i$ represents latitude data, Longitude$_i$ represents longitude data, and Altitude$_i$ represents altitude data. The geographic information of each photovoltaic power station inputted in this embodiment is as follows.

$GI_1[N31.45°, E118.05°, 26.0$ m$]$ $GI_2[N31.42°, E118.34°, 80.0$ m$]$ $GI_3[N31.05°, E118.11°, 26.8$ m$]$

At step (1-2), the installation and operation way $IM_i \in \{A,B,C,D,E,F\}$ of each photovoltaic power station is inputted. A represents a fixed way of optimizing inclination angle, B represents a flat single-axis tracking way, C represents an oblique single-axis tracking way, D represents a two-axis tracking way, E represents a fixed adjustable way, and F represents other installation way. The installation and operation ways of the photovoltaic power station in the related art may be divided into the five categories {A, B, C, D, E}. The installation and operation way F is reserved as a new installation and operation way that may occur in the future. In a conventional condition, photovoltaic panels in a certain photovoltaic power station have the same installation and operation way. When there are a plurality of installation and operation ways at photovoltaic panels in a certain photovoltaic power station, the photovoltaic power station is further divided, and photovoltaic panels in the same installation and operation way are taken as a photovoltaic power station for processing, and a value of i is corrected. For example, there are two installation and operation ways of photovoltaic panels stored in a certain photovoltaic power station i, i.e., $IM_i$={A,B}. In this case, the photovoltaic panels which have two installation operation ways A and B are respectively as a photovoltaic power station j and a photovoltaic power station j+1, and j=i, that is, $IM_i$={$IM_j$,$IM_{j+1}$}. Original numberings (i+1,i+2, . . . N) of other photovoltaic power stations are uprated to (i+2,i+3, . . . , N+1).

The inputted installation and operation ways of respective photovoltaic power stations in this embodiment are as follows.

$IM_1$=A $IM_2$=B $IM_3$=C

At step (1-3), the installation areas $$IA_i = \sum_{j=1}^{n} ia_j$$

of respective photovoltaic power stations are inputted, in which, $ia_j$ represents the area of the $j^{-th}$ photovoltaic panel of the $i^{-th}$ photovoltaic power station, and the unit of the area is m². The inputted installation areas of respective photovoltaic power stations in this embodiment are as follows.

$IA_1$=350000 m²

$IA_2$=120000 m²

$IA_3$=200000 m²

At step (1-4), the component parameters $CP_i=[RT_i, \eta_i^{ef}, \eta_i^{ce}]$ of respective photovoltaic power stations are inputted.

$RT_i$ represents a rated operating temperature of photovoltaic components of the $i^{-th}$ photovoltaic power station, which is provided by a photovoltaic component manufacturer, and the unit of the rated operating temperature is °C.

$\eta_i^{ef}$ represents an equivalent irradiation coefficient of an inclined surface of the $i^{-th}$ photovoltaic power station, which is determined by the installation and operation way of the $i^{-th}$ photovoltaic power station and provided by the photovoltaic component manufacturer based on the installation and operation way.

$\eta_i^{ce}$ represents the conversion efficiency of the $i^{-th}$ photovoltaic power station, which is determined by technical parameters of photovoltaic components. The conversion efficiency may include a conversion efficiency of components, an efficiency of an inverter, and a correction for line loss, which are provided by a manufacturer technical handbook. The inputted component parameters of respective photovoltaic power stations in this embodiment are as follows.

$CP_1$=[44° C.,85.5%,15.6%]

$CP_2$=[43° C.,80.2%,15.3%]

$CP_1$=[45° C.,79.2%,15.8%]

At step (2), historical weather information bases of respective photovoltaic power stations are established, and historical irradiation characteristic indicators of respective photovoltaic power stations are calculated. The historical irradiation characteristic indicators of each photovoltaic power station may include at least one of: a total year irradiation, an average daily irradiation, a maximum value of daily irradiations, a minimum value of daily irradiations, and an imbalance daily irradiation corresponding to each photovoltaic power station. Step (2) also includes following steps.

At step (2-1), each weather monitoring station corresponding to each photovoltaic power station is determined based on geographic information of each photovoltaic power station. The weather monitoring station closest to the photovoltaic power station is selected as the weather monitoring station corresponding to the photovoltaic power station according to the latitude, longitude, and altitude of each photovoltaic power station, and the latitude, longitude, and altitude of each weather monitoring station.

At step (2-2), historical weather information corresponding to respective weather monitoring stations is inputted as historical weather data sets corresponding to respective photovoltaic power station, which are respectively recorded by $WD_1$, $WD_2$, $WD_3$ and $WD_i=\{WI_{year}|year=year1, year2, \ldots, yearn\}$. $WI_{year}$ represents the weather data set of the weather monitoring station corresponding to the $i^{-th}$ photovoltaic power station in a certain year. The weather data sets are sorted in chronological order of years. In other words, $WI_{year1}$ represents the weather data set in the historical weather data set in the year 1 (i.e., the first year), and $WI_{yearn}$ represents the weather data set in the historical weather data set in the year n (i.e., the $n^{-th}$ year). For example, when weather data sets of the weather monitoring station in years from 1981 to 2010 are inputted, year1=1981, and yearn=2010. Years corresponding to the historical weather data in this embodiment are year=[1981, 2015].

At step (2-3), calculating the irradiation characteristic indicators of the historical weather data of respective photovoltaic power stations include following steps.

At step (2-3-1), total year irradiations $SQT_1$ (year), $SQT_2$ (year), $SQT_3$ (year) of respective photovoltaic power stations are calculated by a formula of:

$$SQT_i(\text{year}) = \sum_{d=1}^{D} SQR_i^{year}(d).$$

$SQT_i$(year) represents the total year irradiation of the $i^{-th}$ photovoltaic power station in the year, and the unit of the year total irradiation is MJ/m².

$SQR_i^{year}(d)$ represents the total year irradiation of the $i^{-th}$ photovoltaic power station on the $d^{-th}$ of the year, the unit of which is MJ/(m²□d).

D represents the total number of days in the year, the total number of days is 365 in a standard calendar, and the total number of days is 366 in a leap year.

At step (2-3-2), average daily irradiations $\overline{SQR}_1$ (year), $\overline{SQR}_2$ (year), $\overline{SQR}_3$ (year) of respective photovoltaic power stations are calculated by a formula of:

$$\overline{SQR}_i(\text{year}) = \frac{SQT_i(\text{year})}{D}.$$

At step (2-3-3), maximum values $RMAX_1$ (year), $RMAX_2$ (year) of daily irradiations of respective photovoltaic power stations are calculated by a formula of:

$R\,MAX_i(\text{year})=\max(SQR_i^{year}(d))$.

$RMAX_i$(year) represents the maximum value of daily irradiations of the $i^{-th}$ photovoltaic power station in the year.

max ( ) represents a standard function calculating the maximum value.

At step (2-3-4), minimum values $RMIN_1$ (year), $RMIN_2$ (year) of daily irradiations of respective photovoltaic power stations are calculated by a formula of:

$R\,MIN_i(\text{year})=\min(SQR_i^{year}(d))$.

$RMIN_i$(year) represents the minimum value of daily irradiations of the $i^{-th}$ photovoltaic power station in the year.

min( ) represents a standard function calculating the minimum value.

At step (2-3-5), imbalance daily irradiations $RD_1$ (year), $RD_2$ (year), $RD_3$ (year) of respective photovoltaic power stations are calculated by a formula of:

$RD_i(\text{year})=\max(SQR_i^{year}(d))-\min(SQR_i^{year}(d))$.

At the step (3), based on the historical irradiation characteristic indicators of each photovoltaic power station, which are calculated at the step (2), a typical scene year is selected, and whole-scene-year weather bases of respective photovoltaic power stations are generated. The typical scene year refers to a year which may reflect a typical characteristic of the historical weather information of each photovoltaic power station, such as a year with a historical maximum value, a year with a historical minimum value, a year with a historical imbalance maximum value, and the like. By selecting the typical scene year, weather data confirming to a basic characteristic of the historical weather information and covering extreme cases may be obtained. The step (3) includes following steps.

At step (3-1), the typical scene year is selected based on the historical irradiation characteristic indicators of the photovoltaic power station includes following steps.

At step (3-1-1), a year corresponding to the maximum value of average daily irradiations and a year corresponding to the minimum value of average daily irradiations of all the photovoltaic power stations are selected. That is, a year corresponding to max ($RMAX_i$(year)) and a year corresponding to min($\overline{SQR_i}$(year)) are selected.

At step (3-1-2), a year corresponding to the maximum value of daily irradiations and a year corresponding to the minimum value of daily irradiations of all the photovoltaic power stations are selected. That is, a year corresponding to max($RMAX_i$(year)) and a year corresponding to min ($RMIN_i$(year)) are selected.

At step (3-1-3), a year corresponding to the maximum value of imbalance daily irradiations and a year corresponding to the minimum value of imbalance daily irradiations of all the photovoltaic power stations are selected. That is, a year corresponding to max($RD_i$(year)) and a year corresponding to min($RD_i$(year)) are selected.

In this embodiment, by this step, six years, respectively being 1985, 1991, 1993, 2002, 2008 and 2010, are selected.

At step (3-2), selecting a sequence of weather information of the photovoltaic power station by hours based on the above typical scene year as the whole-scene-year weather base with a typical radiation characteristic corresponding to each photovoltaic power station, includes following steps.

At step (3-2-1), a sequence of irradiations is selected by hours.

The sequence $SR_i^{year}(t)$ of irradiations in the above six years is selected. That is, $SR_i^{year}(t)$ represents a sequence of irradiations of the i-$^{th}$ photovoltaic power station in the year, t=1, 2, . . . ,T, a value of T is 8760 in a standard calendar, and a value of T is 8784 in a leap year.

At step (3-2-2), a sequence of temperature values is selected by hours. The sequence $ET_i^{year}(t)$ of temperature values in the six years is selected.

At the step (4), calculating power sequences of respective photovoltaic power station in respective typical scene years includes following steps.

At the step (4-1), correction coefficient sequences $\eta_1^{year}(t)$, $\eta_2^{year}(t)$, $\eta_3^{year}(t)$ of respective photovoltaic power stations are calculated by a formula of:

$$\eta_i^{year}(t) = 1 + \varphi\left(ET_i^{year}(t) - 25° \text{ C.} + \frac{(RT_i - 20° \text{ C.})SR_i^{year}(t)}{800 \text{ W/m}^2}\right).$$

At the step (4-2), the whole year power sequences $PV_1^{year}(t)$, $PV_2^{year}(t)$, $PV_3^{year}(t)$ are calculated by a formula of:

$$PV_i^{year}(t) = SR_i^{year}(t) * IA_i * \eta(IM_i) * \eta_i^{year}(t) * \eta(CP_i).$$

Figure 2A:
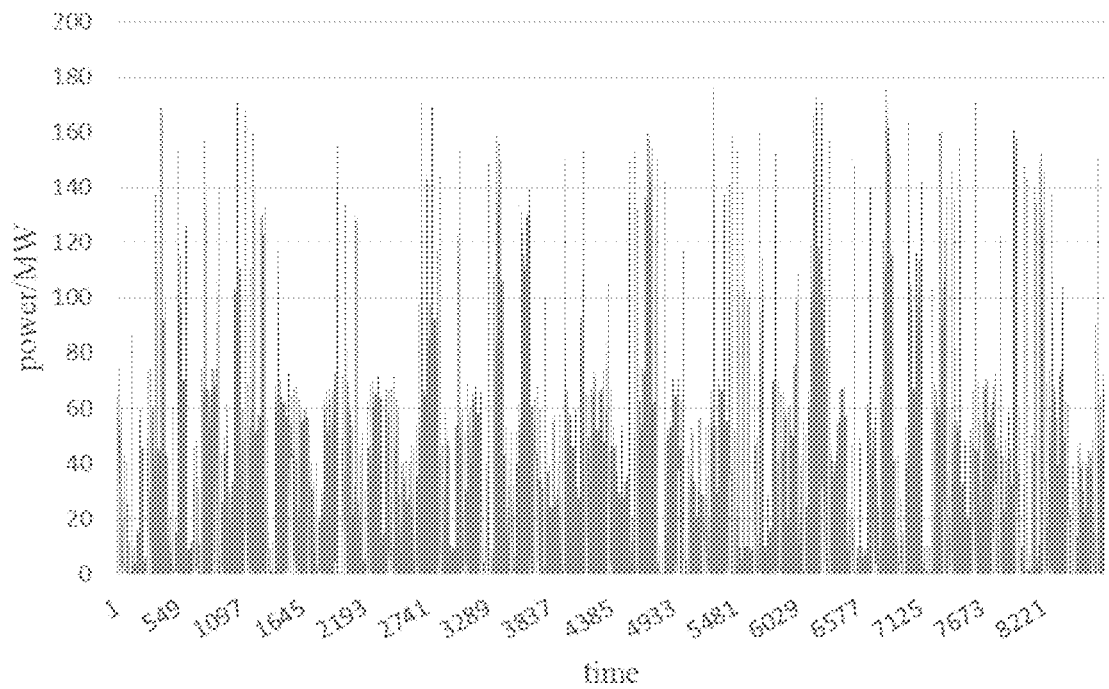
FIGS. 2(a), 2(b), and 2(c) illustrate whole year capacity sequences of three photovoltaic power stations taking a scene in 2010 as an example in the present disclosure.
Figure 2B:
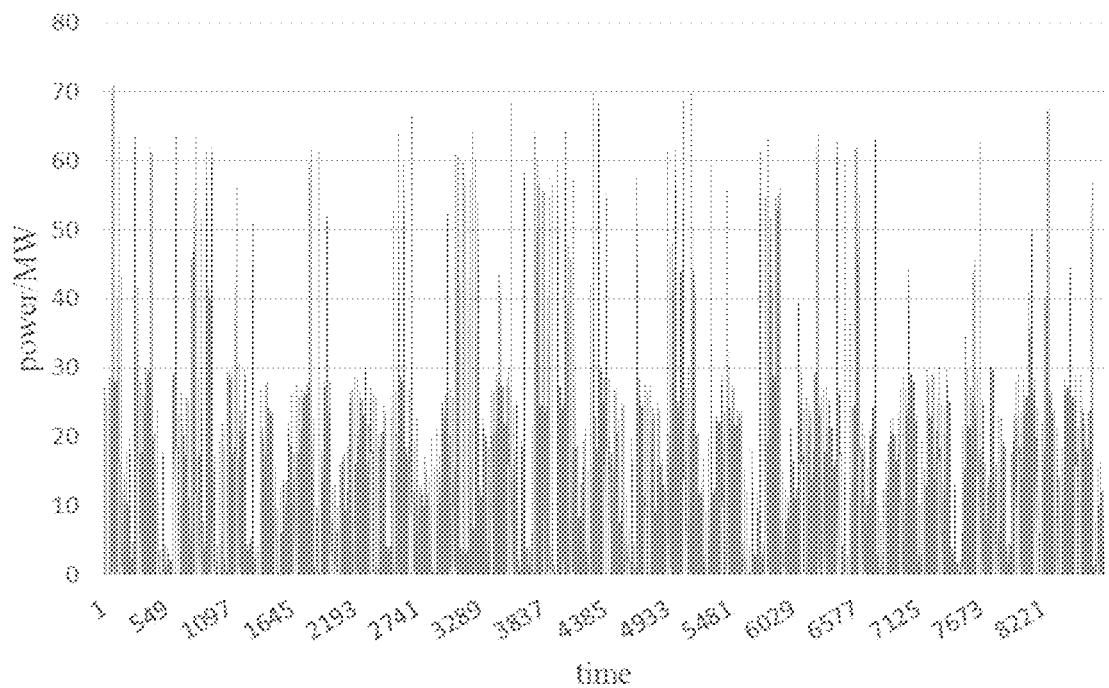
Figure 2C:
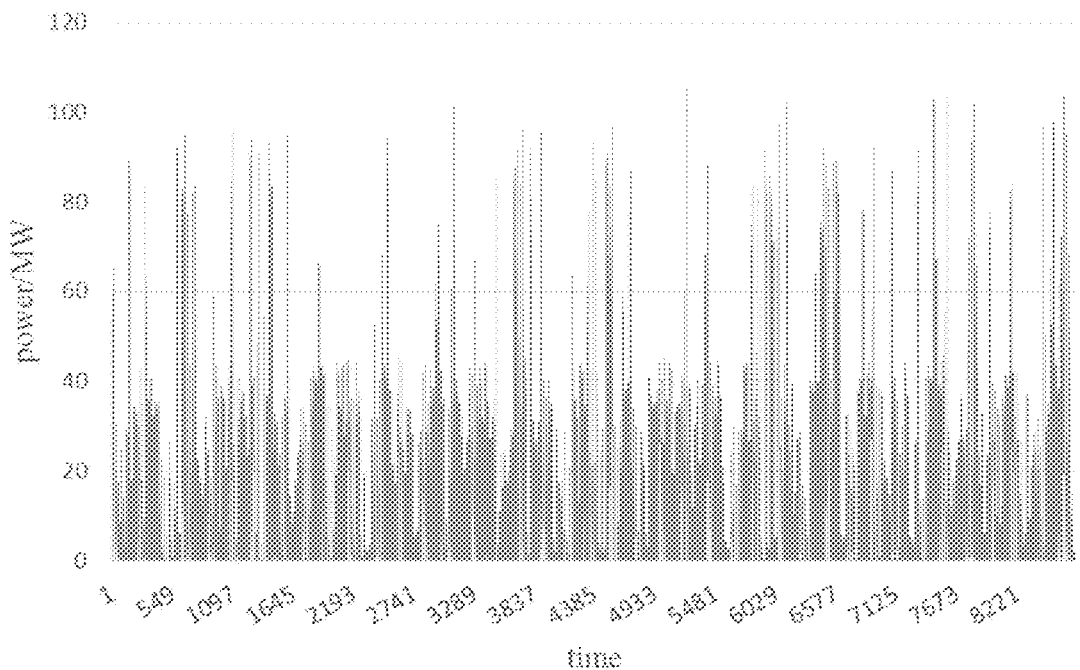

Taking a scene in 2010 as an example, obtained whole year power sequences of the three photovoltaic power stations are respectively illustrated as FIG. 2(a), FIG. 2(b), and FIG. 2(c).

At step (5), performing a timing operation simulation of the power system based on an optimizing target taking a daily operation simulation with a minimum operation cost for a year, to obtain a year actual power sequence of each photovoltaic power station, includes following steps.

At step (5-1), inputting information of loads, branches, and generator units of the power system. The inputted information may include: load curve, branch reactance, branch resistance, branch capacitance, branch transmission capacity, unit type, unit capacity, forced outage rate, start-stop cost, fixed operation cost and the like operates and simulates basic parameters.

At step (5-2), an operation simulation process of the power system is determined based on the inputted data at step (5-1).

Figure 3:
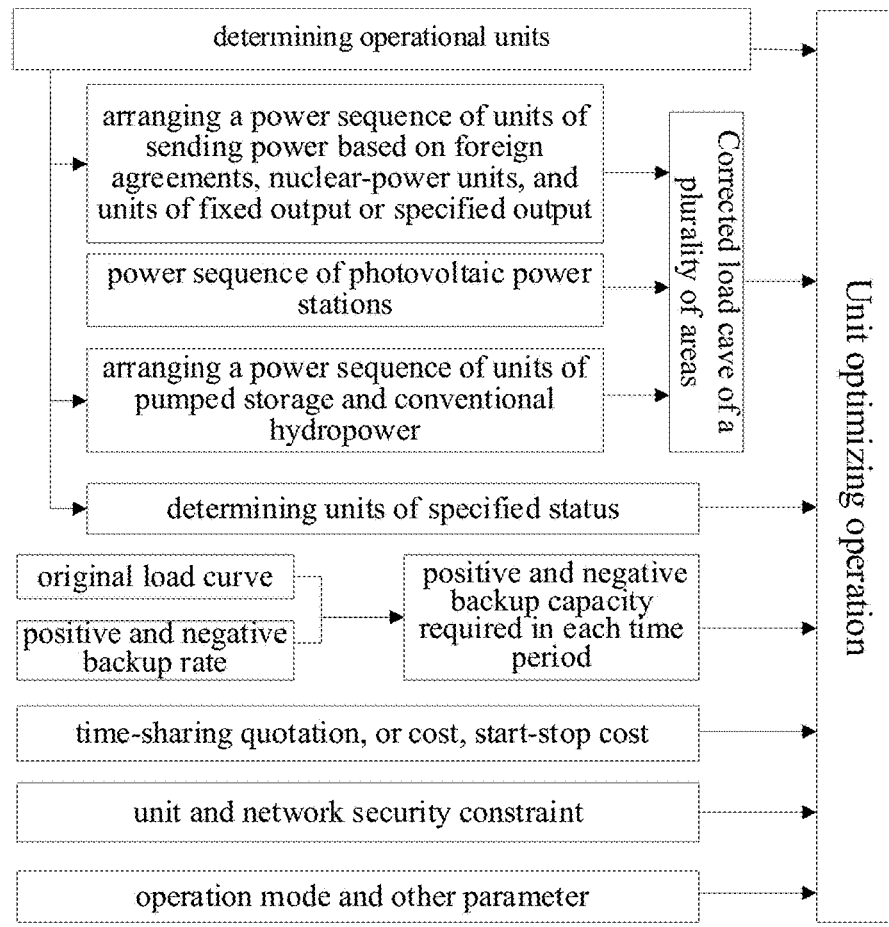
FIG. 3 is a flow chart illustrating timing operation simulation of a power system in embodiments of the present disclosure.

The operation simulation is a basic problem of the power system field. There are many researches and conventional process methods in the related art for the operation simulation. Embodiments of the present disclosure employ a method for determining the operation simulation based on a timing load curve of the power system. The process of the method is illustrated in FIG. 3.

The method for determining the operation simulation based on the timing load curve is based on daily running simulation. Firstly, status of units on the day is determined based on a unit installation schedule and a unit maintenance plan, including: determining operational units on the day, arranging a power sequence of units of fixed output or specified output, arranging a power sequence of units of pumped storage and conventional hydropower, determining units of specified status. Secondly, according to the power sequence of the photovoltaic power stations, the power sequence of units of fixed output or specified output, and the power sequence of units of pumped storage and conventional hydropower, the corrected load curve is obtained. Then, a positive and negative backup capacity required by the power system in each time period is determined based on the original load curve and a positive and negative backup rate. Finally, unit optimization operation is performed based on the operational units on the day, the corrected load curve, units of specified status, the positive and negative backup capacity required by the power system in each time period, the time-division unit cost and start-stop cost, the unit and network security constraint, an operation mode, and other parameter, to obtain a daily operation simulation result of the power system. The daily operation simulation result is a timing sequence operation simulation result required by the power system.

At step (5-3), the timing operation simulation is performed based on an optimizing target taking a minimum operation cost of the power system for a whole year, to obtain year actual power sequences of respective photovoltaic power stations.

The target function of operation simulation in this embodiment has the cheapest operation cost in the simulation period, i.e., the power system in a whole year has the cheapest operation cost. The constraint condition includes a power balance constraint, power upper and lower limit constraints, system positive and negative backup constraints, branch current upper and lower limit constraints, section flow upper and lower limit constraints, start-stop group minimum downtime, start time constraints, unit climbing constraints, hydropower unit power constraints and pumped unit pumped generating balance constraints.

At step (6), calculating the capacities of respective photovoltaic power stations in different typical scene years based on the actual power sequences of respective photovoltaic power stations obtained by the timing operation simulation includes following steps.

At step (6-1), actual generating capacities of respective photovoltaic power stations are calculated based on actual power sequences of respective photovoltaic power stations in a year in the timing operation simulation result by a formula of:

$$PVQ_i^{year} = \sum_{t=1}^{T} PVR_i^{year}(t).$$

At step (6-2), available generating capacities $PVA_1^{year}$, $PVA_2^{year}$, $PVA_3^{year}$ of respective photovoltaic power stations are calculated based on the power sequences of respective photovoltaic power stations by a formula of:

$$PVA_i^{year} = \sum_{t=1}^{T} PV_i^{year}(t).$$

At step (6-3), capacities of respective photovoltaic power stations are calculated according to the actual generating capacities and the available generating capacities of respective photovoltaic power stations by a formula of:

$$\square_i^{year} = \frac{PVQ_i^{year}}{PVA_i^{year}} * 100\%.$$

With this embodiment, according to the timing sequence operation result of the power system, rich photovoltaic generating grid interconnection data may be obtained. The capacity of the photovoltaic power station is analyzed from a plurality of angles. The available generating capacity, the actual generating capacity and the capacity of the generating capacity are shown herein, which are illustrated in tables 1, 2 and 3.

TABLE 1 available generating capacities of the photovoltaic power station

| | serial numbers of photovoltaic power station | | |
|---|---|---|---|
| | 1 | 2 | 3 |
| Scene in 1985 | 48654 | 13325 | 25979 |
| Scene in 1991 | 50482 | 14260 | 27815 |
| Scene in 1993 | 47329 | 12861 | 24983 |
| Scene in 2002 | 47690 | 13294 | 26108 |
| Scene in 2008 | 49517 | 14153 | 26619 |
| Scene in 2010 | 48424 | 13697 | 26209 |

TABLE 2 actual generating capacities of the photovoltaic power station

| | serial numbers of photovoltaic power station | | |
|---|---|---|---|
| | 1 | 2 | 3 |
| Scene in 1985 | 45491 | 12685 | 24966 |
| Scene in 1991 | 36246 | 10724 | 20194 |
| Scene in 1993 | 39378 | 10945 | 20711 |
| Scene in 2002 | 37961 | 10742 | 20495 |
| Scene in 2008 | 43624 | 12837 | 24010 |
| Scene in 2010 | 41354 | 11957 | 22697 |

TABLE 3 capacity ratios of the photovoltaic generating

| | serial numbers of photovoltaic power station | | |
|---|---|---|---|
| | 1 | 2 | 3 |
| Scene in 1985 | 93.5% | 95.2% | 96.1% |
| Scene in 1991 | 71.8% | 75.2% | 72.6% |
| Scene in 1993 | 83.2% | 85.1% | 82.9% |
| Scene in 2002 | 79.6% | 80.8% | 78.5% |
| Scene in 2008 | 88.1% | 90.7% | 90.2% |
| Scene in 2010 | 85.4% | 87.3% | 86.6% |

In conclusion, the present disclosure fully considers the historical irradiation characteristics of the photovoltaic power station to simulate the capacity of the photovoltaic power station, such that the power sequence of the photovoltaic power station is closer to actual operation, and effects caused by different weather factors may be considered. Detailed and accurate actual capacity data of the photovoltaic power station is obtained by the timing operation simulation of the power system, thus implementing an accurate evaluation for the capacity of the photovoltaic power station and providing a basis for the planning and operation of the photovoltaic generating.

The beneficial effects of the present disclosure are as follows.

The irradiation characteristic is calculated by the historical weather information provided by the weather monitoring station corresponding to the photovoltaic power station, the whole-year-scene weather bases with typical irradiation characteristic corresponding to respective photovoltaic power stations are generated. The whole year power sequences of the photovoltaic power station in respective scene years are calculated in combination with the basic information of the photovoltaic power station. By performing a timing operation simulation of the power system based on the optimizing target with the minimum operation cost in a whole year, the actual power sequences of respective photovoltaic power stations are obtained. The capacities of respective photovoltaic power stations are obtained. In this way, the photovoltaic capacity sequence is closer to the actual operation, including much weather information. The timing operation simulation result is closer to the actual operation of the power system. With the method, the obtained capacity of the photovoltaic generating may provide a reliable basis for the planning operation of photovoltaic generating.

The present disclosure may be applied to the photovoltaic power station, to calculate the capacity of the photovoltaic power station and determine an optimizing establishing capacity. The higher the capacity of the photovoltaic power station, the available generating is closer to the actual generating of the photovoltaic power station, and the higher investment income of the photovoltaic power station is.

When the photovoltaic power station is planned and established, a plurality of solutions are provided, which respectively correspond to different photovoltaic generating capacities. For different planned solutions, the capacity of the photovoltaic power station is calculated respectively by employing the present disclosure, and a solution with a highest capacity is the optimizing solution to perform the establishing.

The description of the specification of the present disclosure provided above is exemplary, which is not limited to the present disclosure. Based on the above description, it is possible to make many modifications and changes for the present disclosure. Therefore, the embodiments were chosen and described in order to better explain the principles and applications of the present disclosure. It should be understood by the skilled in the art that, all modifications and variations are within the scope of the present disclosure as defined by the claims without departing from the technical idea of the present disclosure.

What is claimed is:

1. A method for calculating capacities of a plurality of photovoltaic power stations, wherein the plurality of photovoltaic power stations correspond to a plurality of weather monitoring stations, each photovoltaic power station in the plurality of photovoltaic power stations has a one-to-one correspondence with each weather monitoring station in the plurality of weather monitoring stations, the method comprises:

dividing each of the plurality of photovoltaic power stations when there are plurality of installation and operation ways among photovoltaic panels of each of the plurality of photovoltaic power stations;

receiving a plurality of historical weather data sets from the plurality of weather monitoring stations, each historical weather data set in the plurality of historical weather data sets having a one-to-one correspondence with each photovoltaic power station in the plurality of photovoltaic power stations;

determining a scene year based on the plurality of historical weather data sets;

receiving an actual generating capacity of each photovoltaic power station in the plurality of photovoltaic power stations predicted by a power system dispatch center;

extracting weather data of each photovoltaic power station in the plurality of photovoltaic power stations in the scene year from the corresponding historical weather data set, wherein, extracting the weather data of each photovoltaic power station in the plurality of photovoltaic power stations in the scene year from the corresponding historical weather data set, comprises:

extracting a plurality of irradiations of each photovoltaic power station in the plurality of photovoltaic power stations in the scene year; sorting the plurality of irradiations by hours to obtain a first sequence, in which, the first sequence is represented by $SR_i^{year}(t)$, t represents a serial number of period of time, each period of time represents one hour, t=1,2, . . . , T, a value of T is 8760 in a standard calendar, a value of T is 8784 in a leap year, year represents the scene year, $SR_i^{year}(t)$ represents an irradiation of an $i^{-th}$ photovoltaic power station in a $t^{-th}$ period of time in the scene year year; extracting a plurality of temperature values of each photovoltaic power station in the plurality of photovoltaic power stations in the scene year; and sorting the plurality of temperature values by hours to obtain a second sequence, in which, the second sequence is represented by $ET_i^{year}(t)$, $ET_i^{year}(t)$ represents a temperature value of the $i^{-th}$ photovoltaic power station in the $t^{-th}$ period of time in the scene year year;

obtaining an available generating capacity of each photovoltaic power station in the plurality of photovoltaic power stations in the scene year based on the weather data; and determining a capacity of each photovoltaic power station in the scene year according to the actual generating capacity and the available generating capacity of each photovoltaic power station.

2. The method of claim 1, wherein, the scene year comprises at least one of:

a year corresponding to a maximum value of average daily irradiations in the plurality of historical weather data sets;

a year corresponding to a minimum value of average daily irradiations in the plurality of historical weather data sets;

a year corresponding to a maximum value of daily irradiations in the plurality of historical weather data sets;

a year corresponding to a minimum value of daily irradiations in the plurality of historical weather data sets;

a year corresponding to a maximum value of imbalance daily irradiations in the plurality of historical weather data sets; and a year corresponding to a minimum value of imbalance daily irradiations in the plurality of historical weather data sets.

3. The method of claim 1, wherein, obtaining the available generating capacity of each photovoltaic power station in the plurality of photovoltaic power stations in the scene year based on the weather data, comprises:

determining a correction coefficient sequence based on the first sequence and the second sequence;

correcting the first sequence based on the correction coefficient sequence, to obtain a power sequence of each photovoltaic power station in the plurality of photovoltaic power stations in the scene year; and determining the available generating capacity of each photovoltaic power station according to the power sequence in the scene year.

4. The method of claim 3, wherein, determining the correction coefficient sequence based on the first sequence and the second sequence comprises:

determining the correction coefficient sequence based on the first sequence and the second sequence by a formula of:

$$\eta_i^{year}(t) = 1 + \varphi\left(ET_i^{year}(t) - 25°\text{ C.} + \frac{(RT_i - 20°\text{ C.})SR_i^{year}(t)}{800 \text{ W/m}^2}\right),$$

where, the correction coefficient sequence is denoted as $\eta_i^{year}(t)$, $\eta_i^{year}(t)$ represents a power correction coefficient of the $i^{-th}$ photovoltaic power station in the $t^{-th}$ period of time in the scene year year, $\varphi$ represents a peak power temperature coefficient, and $RT_i$ represents a rated operating temperature of the $i^{-th}$ photovoltaic power station.

5. The method of claim 3, wherein, correcting the first sequence based on the correction coefficient sequence, to obtain the power sequence of each photovoltaic power station in the plurality of photovoltaic power stations in the scene year, comprises:

correcting the first sequence based on the correction coefficient sequence to obtain the power sequence of each photovoltaic power station in the plurality of photovoltaic power stations in the scene year by a formula of:

$$PV_i^{year}(t)=SR_i^{year}(t)*IA_i*\eta(IM_i)*\eta_i^{year}(t)*\eta(CP_i),$$

where the power sequence is denoted as $PV_i^{year}(t)$, $PV_i^{year}(t)$ represents an available power of the $i^{-th}$ photovoltaic power station in the $t^{-th}$ period of time in the scene year year, $\eta(IM_i)$ represents an equivalent irradiation coefficient of an inclined surface of the $i^{-th}$ photovoltaic power station, $\eta(CP_i)$ represents a conversion efficiency of the $i^{-th}$ photovoltaic power station, and $IA_i$ represents an installation area of the $i^{-th}$ photovoltaic power station.

6. The method of claim 5, wherein, determining the available generating capacity of each photovoltaic power station according to the power sequence in the scene year, comprises:
determining the available generating capacity of each photovoltaic power station according to the power sequence in the scene year by a formula of $$PVA_i^{year} = \sum_{t=1}^{T} PV_i^{year}(t),$$

where, $PVA_i^{year}$ represents the available generating capacity of the $i^{-th}$ photovoltaic power station in the scene year year.

7. The method of claim 1, wherein, receiving the actual generating capacity of each photovoltaic power station in the plurality of photovoltaic power stations predicted by the power system dispatch center, comprises:
receiving an actual power sequence $PVR_i^{year}(t)$ of each photovoltaic power station predicted by the power system dispatch center for the scene year, $PVR_i^{year}(t)$ representing an actual power of the $i^{-th}$ photovoltaic power station in the $i^{-th}$ period of time in the scene year year; and
calculating the actual generating capacity of each photovoltaic power station based on the actual power sequence of each photovoltaic power station by a formula of:

$$PVQ_i^{year} = \sum_{t=1}^{T} PVR_i^{year}(t),$$

where, $PVQ_i^{year}$ represents the actual generating capacity of the $i^{-th}$ photovoltaic power station.

8. The method of claim 7, wherein, determining the capacity of each photovoltaic power station in the scene year according to the actual generating capacity and the available generating capacity of each photovoltaic power station, comprises:
determining the capacity of each photovoltaic power station in the scene year according to the actual generating capacity and the available generating capacity of each photovoltaic power station by a formula of:

$$\square_i^{year} = \frac{PVQ_i^{year}}{PVA_i^{year}} * 100\%,$$

where, $\square_i^{year}$ represents the capacity of the $i^{-th}$ photovoltaic power station in the scene year year.

9. The method of claim 5, further comprising:
determining a plurality of capacities of each photovoltaic power station in a plurality of installation areas; and
taking an installation area corresponding to a maximum capacity in the plurality of capacities as a final installation area of each photovoltaic power station.

10. An apparatus for calculating capacities of a plurality of photovoltaic power stations, wherein the plurality of photovoltaic power stations correspond to a plurality of weather monitoring stations, each photovoltaic power station in the plurality of photovoltaic power stations has a one-to-one correspondence with each weather monitoring station in the plurality of weather monitoring stations, the apparatus comprising:
a processor; and
a memory, configured to store computer instructions;
wherein, the processor is configured to execute the computer instructions, to carry out:
dividing each of the plurality of photovoltaic power stations when there are plurality of installation and operation ways among photovoltaic panels of each of the plurality of photovoltaic power stations;
receiving a plurality of historical weather data sets from the plurality of weather monitoring stations, each historical weather data set in the plurality of historical weather data sets having a one-to-one correspondence with each photovoltaic power station in the plurality of photovoltaic power stations;
determining a scene year based on the plurality of historical weather data sets;
receiving an actual generating capacity of each photovoltaic power station in the plurality of photovoltaic power stations predicted by a power system dispatch center;
extracting weather data of each photovoltaic power station in the plurality of photovoltaic power stations in the scene year from the corresponding historical weather data set, wherein, extracting the weather data of each photovoltaic power station in the plurality of photovoltaic power stations in the scene year from the corresponding historical weather data set, comprises: extracting a plurality of irradiations of each photovoltaic power station in the plurality of photovoltaic power stations in the scene year; sorting the plurality of irradiations by hours to obtain a first sequence, in which, the first sequence is represented by $SR_i^{year}(t)$, t represents a serial number of period of time, each period of time represents one hour t=1,2, . . . , T, a value of T is 8760 in a standard calendar, a value of T is 8784 in a leap year, year represents the scene year, $SR_i^{year}(t)$ represents an irradiation of an $i^{-th}$ photovoltaic power station in a $t^{-th}$ period of time in the scene year year; extracting a plurality of temperature values of each photovoltaic power station in the plurality of photovoltaic power stations in the scene year; and sorting the plurality of temperature values by hours to obtain a second sequence, in which, the second sequence is represented by $ET_i^{year}(t)$, $ET_i^{year}(t)$ represents a temperature value of the $i^{-th}$ photovoltaic power station in the $t^{-th}$ period of time in the scene year year;
obtaining an available generating capacity of each photovoltaic power station in the plurality of photovoltaic power stations in the scene year based on the weather data; and determining a capacity of each photovoltaic power station in the scene year according to the actual generating capacity and the available generating capacity of each photovoltaic power station.

11. The apparatus of claim 10, wherein, the scene year comprises at least one of:
a year corresponding to a maximum value of average daily irradiations in the plurality of historical weather data sets;
a year corresponding to a minimum value of average daily irradiations in the plurality of historical weather data sets;
a year corresponding to a maximum value of daily irradiations in the plurality of historical weather data sets;
a year corresponding to a minimum value of daily irradiations in the plurality of historical weather data sets;
a year corresponding to a maximum value of imbalance daily irradiations in the plurality of historical weather data sets; and
a year corresponding to a minimum value of imbalance daily irradiations in the plurality of historical weather data sets.

12. The apparatus of claim 10, wherein, obtaining the available generating capacity of each photovoltaic power station in the plurality of photovoltaic power stations in the scene year based on the weather data, comprises:
determining a correction coefficient sequence based on the first sequence and the second sequence;
correcting the first sequence based on the correction coefficient sequence, to obtain a power sequence of each photovoltaic power station in the plurality of photovoltaic power stations in the scene year; and
determining the available generating capacity of each photovoltaic power station according to the power sequence in the scene year.

13. The apparatus of claim 12, wherein, determining the correction coefficient sequence based on the first sequence and the second sequence comprises:
determining the correction coefficient sequence based on the first sequence and the second sequence by a formula of:

$$\eta_i^{year}(t) = 1 + \varphi\left(ET_i^{year}(t) - 25°\text{ C.} + \frac{(RT_i - 20°\text{ C.})SR_i^{year}(t)}{800\text{ W/m}^2}\right),$$

where, the correction coefficient sequence is denoted as $\eta_i^{year}(t)$, $\eta_i^{year}(t)$ represents a power correction coefficient of the $i^{-th}$ photovoltaic power station in the $t^{th}$ period of time in the scene year year, $\varphi$ represents a peak power temperature coefficient, and $RT_i$ represents a rated operating temperature of the $i^{-th}$ photovoltaic power station.

14. The apparatus of claim 12, wherein, correcting the first sequence based on the correction coefficient sequence, to obtain the power sequence of each photovoltaic power station in the plurality of photovoltaic power stations in the scene year, comprises:
correcting the first sequence based on the correction coefficient sequence to obtain the power sequence of each photovoltaic power station in the plurality of photovoltaic power stations in the scene year by a formula of:

$$PV_i^{year}(t) = SR_i^{year}(t) * IA_i * \eta(IM_i) * \eta_i^{year}(t) * \eta(CP_i),$$

where the power sequence is denoted as $PV_i^{year}(t)$, $PV_i^{year}(t)$ represents an available power of the $i^{-th}$ photovoltaic power station in the $t^{-th}$ period of time in the scene year year, $\eta(IM_i)$ represents an equivalent irradiation coefficient of an inclined surface of the $i^{-th}$ photovoltaic power station, $\eta(CP_i)$ represents a conversion efficiency of the $i^{-th}$ photovoltaic power station, and $IA_i$ represents an installation area of the $i^{-th}$ photovoltaic power station.

15. The apparatus of claim 14, wherein, determining the available generating capacity of each photovoltaic power station according to the power sequence in the scene year, comprises:
determining the available generating capacity of each photovoltaic power station according to the power sequence in the scene year by a formula of $$PVA_i^{year} = \sum_{t=1}^{T} PV_i^{year}(t),$$

where, $PVA_i^{year}$ represents the available generating capacity of the $i^{-th}$ photovoltaic power station in the scene year year.

16. The apparatus of claim 10, wherein, receiving the actual generating capacity of each photovoltaic power station in the plurality of photovoltaic power stations predicted by the power system dispatch center, comprises:
receiving an actual power sequence $PVR_i^{year}(t)$ of each photovoltaic power station predicted by the power system dispatch center for the scene year, $PVR_i^{year}(t)$ representing an actual power of the $i^{-th}$ photovoltaic power station in the $i^{-th}$ period of time in the scene year year; and
calculating the actual generating capacity of each photovoltaic power station based on the actual power sequence of each photovoltaic power station by a formula of:

$$PVQ_i^{year} = \sum_{t=1}^{T} PVR_i^{year}(t),$$

where, $PVQ_i^{year}$ represents the actual generating capacity of the $i^{-th}$ photovoltaic power station.

17. The apparatus of claim 16, wherein, determining the capacity of each photovoltaic power station in the scene year according to the actual generating capacity and the available generating capacity of each photovoltaic power station, comprises:
determining the capacity of each photovoltaic power station in the scene year according to the actual generating capacity and the available generating capacity of each photovoltaic power station by a formula of:

$$\square_i^{year} = \frac{PVQ_i^{year}}{PVA_i^{year}} * 100\%,$$

where, $\square_i^{year}$ represents the capacity of the $i^{-th}$ photovoltaic power station in the scene year year.

18. A non-transient computer-readable storage medium having computer instructions stored thereon, wherein, when the computer instructions are executed by a processor, the computer instructions are configured to execute:

dividing each of the plurality of photovoltaic power stations when there are plurality of installation and operation ways among photovoltaic panels of each of the plurality of photovoltaic power stations;

receiving a plurality of historical weather data sets from a plurality of weather monitoring stations, each historical weather data set in the plurality of historical weather data sets having a one-to-one correspondence with each photovoltaic power station in the plurality of photovoltaic power stations;

determining a scene year based on the plurality of historical weather data sets;

receiving an actual generating capacity of each photovoltaic power station in the plurality of photovoltaic power stations predicted by a power system dispatch center;

extracting weather data of each photovoltaic power station in the plurality of photovoltaic power stations in the scene year from the corresponding historical weather data set, wherein, extracting the weather data of each photovoltaic power station in the plurality of photovoltaic power stations in the scene year from the corresponding historical weather data set, comprises:
extracting a plurality of irradiations of each photovoltaic power station in the plurality of photovoltaic power stations in the scene year; sorting the plurality of irradiations by hours to obtain a first sequence, in which, the first sequence is represented by $SR_i^{year}(t)$, t represents a serial number of period of time, each period of time represents one hour, t=1,2, ... T, a value of T is 8760 in a standard calendar, a value of T is 8784 in a leap year, year represents the scene year, $SR_i^{year}(t)$ represents an irradiation of an $i^{-th}$ photovoltaic power station in a $t^{th}$ period of time in the scene year year; extracting a plurality of temperature values of each photovoltaic power station in the plurality of photovoltaic power stations in the scene year; and sorting the plurality of temperature values by hours to obtain a second sequence, in which, the second sequence is represented by $ET_i^{year}(t)$, $ET_i^{year}(t)$ represents a temperature value of the $i^{-th}$ photovoltaic power station in the $t^{th}$ period of time in the scene year year;

obtaining an available generating capacity of each photovoltaic power station in the plurality of photovoltaic power stations in the scene year based on the weather data; and determining a capacity of each photovoltaic power station in the scene year according to the actual generating capacity and the available generating capacity of each photovoltaic power station.

* * * * *